United States Patent [19]
Werner

[11] 3,763,589
[45] Oct. 9, 1973

[54] COMBINATION ATTACHMENT FOR FISHING RODS

[76] Inventor: Frank D. Werner, 5405 Mount Normandale Curve, Minneapolis, Minn. 55431

[22] Filed: Aug. 31, 1971

[21] Appl. No.: 176,532

[52] U.S. Cl. ............................................... 43/25.2
[51] Int. Cl. .................... A01k 87/00, A01k 97/00
[58] Field of Search ...................... 43/25, 25.2, 18, 43/42.02, 17.2, 42.5; 225/19

[56] References Cited
UNITED STATES PATENTS

| 461,106 | 10/1891 | Oberly | 43/18 |
| 1,809,663 | 6/1931 | Allen | 43/42.5 |
| 2,561,289 | 7/1951 | Paris | 43/25 |
| 2,829,461 | 4/1958 | Tuttle | 43/25.2 |
| 3,128,023 | 4/1964 | Cook | 43/25 |

*Primary Examiner*—Warner H. Camp
*Attorney*—Ralph L. Dugger et al.

[57] ABSTRACT

The device is formed from a single piece of material having side ears to facilitate attachment to a fishing rod and an apertured forward ear for securing a fish hook. The main body portion is slit and a central portion is offset from the remaining portion of the body to provide cutting edges for a fishing line. The fishing rod is provided with balance beam indicia used in conjunction with the device for weighing fish.

6 Claims, 6 Drawing Figures

PATENTED OCT 9 1973 3,763,589
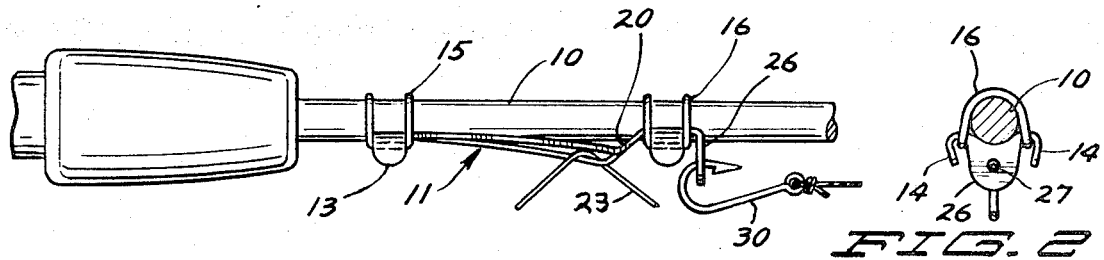
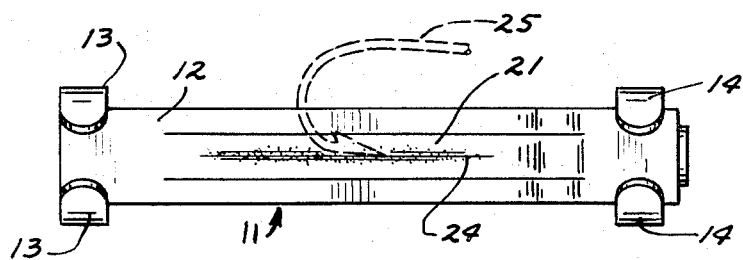
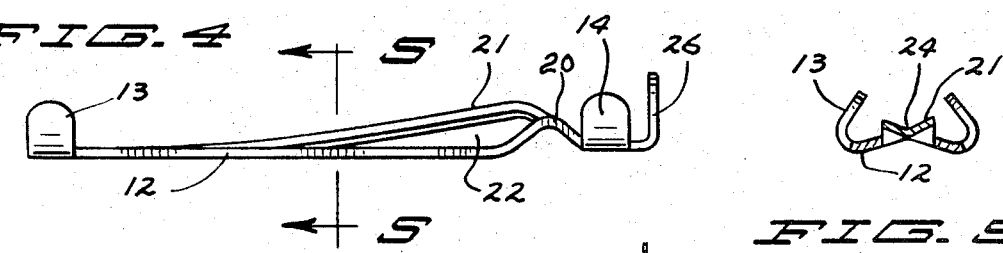
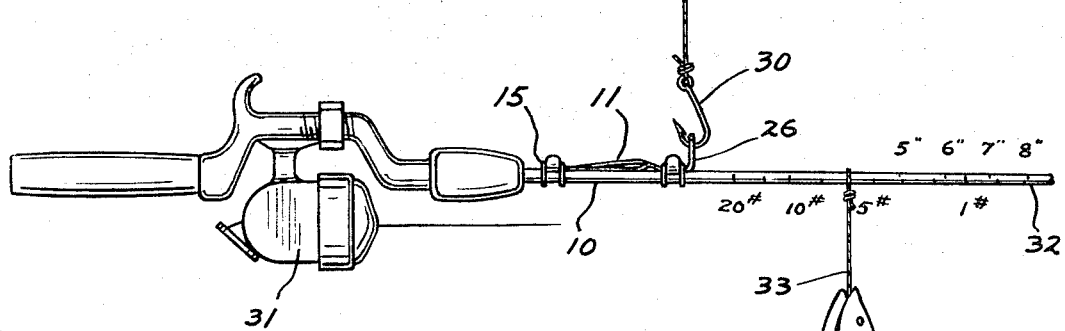
INVENTOR.
FRANK D. WERNER
BY
Dugger, Peterson, Johnson & Westman
ATTORNEYS

COMBINATION ATTACHMENT FOR FISHING RODS

BACKGROUND OF THE INVENTION

1. Field of the Invention.

The present invention relates to a combination attachment for fishing rods.

2. Prior Art.

Combination attachments for fishing rods in various forms have been advanced in the art. For example, U.S. Pat. No. 3,115,722 shows a multipurpose attachment for fishing rods including a fish measuring rule. This device also has a way for dead-ending the hook when not in use, and the device can be used for a fishing rod prop or support as well.

U.S. Pat. No. 2,750,184 illustrates a fishing rod handle with a weight scale and measuring tape built into the handle, but the scale is an ordinary spring scale. U.S. Pat. No. 2,561,289 shows a whetstone and line cutter combination for fishing rods, and U.S. Pat. No. 3,128,023 shows a cutter attachment that is fastened onto the rod with rubber bands.

However, a complete combination unit that is easily made, safe, and permits weighing fish, dead-ending the fishing hook when not in use, cutting the line, and also has means for measuring the length of a fish is not shown in the art.

SUMMARY OF THE INVENTION

The present invention relates to a combination attachment member for fishing rods which has a line cutter, hook sharpener, and a tab having an opening for dead-ending the hook. The unit is held in place in a suitable manner, for example with rubber bands hooked over ears formed into the unit, and the opening for the hook is made so that the entire rod can be supported from a hook or other support through this opening. A balancing weight indicia tape is attached to the rod so that when the rod and reel are supported through the hook opening the rod acts as a balance beam, and by proper calibration a fish can be weighed using the balance beam principle.

BRIEF DESCRIPTION OF THE DRAWINGS

FIG. 1 is a fragmentary side elevational view of a typical fishing rod showing the attachment made according to the present invention retained thereon;

FIG. 2 is an end view of the device of FIG. 1;

FIG. 3 is a bottom view of the attachment as shown in FIG. 1;

FIG. 4 is a side view of the device of FIG. 3 showing it upside down from its position in FIG. 1;

FIG. 5 is a sectional view taken as on line 5—5 in FIG. 4; and

FIG. 6 is a side elevational view of the attachment installed on a fishing rod showing it being used as a balance scale for weighing fish.

DESCRIPTION OF THE PREFERRED EMBODIMENT

A fishing rod 10, as shown, has a combination attachment 11 installed thereon. The attachment 11 comprises an elongated one piece base member 12, having a pair of integral rear ears 13,13 facing each other and extending outwardly from the face of the elongated member, and a pair of forward ears 14,14 also attached to the base member and extending outwardly from the face of the base. The outer ends of the ears are folded partially over the surface of the base 12 as shown in FIGS. 2 and 5 and rubber bands 15 and 16, respectively, can be looped over one of the ears, passed over the fishing rod 10 and looped over the other corresponding ear to hold the rod and the attachment securely together. The rubber bands of course can be tightened and wrapped in place as desired. The base member 12, as shown, is made slightly concave on one side so that the rod will fit into the concave notch formed.

The center portions of the base 12 have a partially punched-out strip 21 that extends outwardly from the plane of the base member 12. The ends of the strip 21 are integral with the base and the strip is bent away from base 12. A notch or offset 20 permits the strip 21 to be bent up. A transverse slot is formed between the strip 21 and the base 12. The cutting slot 22 is formed underneath the punched-out strip 21. The punched-out strip 21, as illustrated, forms two cutting edges, one on either side of the strip. If desired, the partially punched-out strip could be formed with only one cutting edge with the other edge of the strip being the original edge of base member 12. In other words, the bent-up strip 21 would extend from one side of the base member to a single cutting edge formed where the strip was slit from the base member.

A fish line 23 can be passed through either side of the cutting slot 22 as shown in FIG. 1, and moved toward the rear of the fishing rod, toward ears 13, so that the line will be cut along one edge of this punched-out strip 21 and the corresponding edge of the opening in base 12 from which the strip was punched. The inside edges of the strip can be sharpened if desired, but normally the punched edges are sharp enough to provide a cutting edge for fishing line. The end of a line can be cut by inserting it through slot 22 and pulling toward the rod handle. A length of line can be cut by making a loop in the line at the place where the cut is to be made, placing the loop through the slot 22 and pulling toward the rod handle.

The outwardly facing surface 24 of the strip 21, as shown is formed in a shallow concave V (See FIG. 5) and is coated with an abrasive material for sharpening, such as aluminum oxide particles or tungsten carbide particles. The unit thus can be used also as a sharpener for fish hooks. The point of a fish hook shown in dotted lines at 25, can be rubbed longitudinally along the surface 24 of the strip 21, and sharpened. The shallow concave V shape of the surface 24 helps contour the point of the hook and keeps the hook from slipping off the sharpener.

At the forward end of the unit, a bent-up ear 26 is integral with the base 12, and extend outwardly therefrom at substantially right angles to the longitudinal axis of the fishing rod 10. This ear 26 has an opening 27 defined therethrough which is of size to receive a fish hook illustrated in solid lines at 30. The fish hook 30 can be dead-ended back into the opening 27 in ear 26 as shown in FIG. 1 when the rod is not in use, or, as shown in FIG. 6, the ear 26 and the opening 27 can be used to support the entire rod assembly. The reel 31 and major portion of rod 10 are on the opposite sides of the ear 26. The rod assembly then acts as a balance beam member. A strip or tape 32 calibrated with balance beam indicia in pounds can be placed on the fishing rod, and by having a suitable support 33 for a fish 34, and by proper calibration, the entire unit can act as a balance beam being supported in the opening 27 with the hook 30. In addition, the strip 32 can be marked or imprinted in inches, as indicated on the top of the view to form a ruler so that the length of fish 34 can also be determined by laying the fish alongside the rod. The strip can be self-adhering tape reinforced with thread to prevent stretching. The inner end would be placed adjacent ear member 26.

Thus the combination tool provides a line cutter, fish hook sharpener, attachment point for dead-ending the hook, and a support member for creating a balance beam. The unit is simple to make and therefore can be mass produced at a low cost. The unit is also simple to install with the rubber bands shown, and of course other means of installation can be utilized such as adhesives, or other suitable clamps.

The use of a partially punched-out strip to form a line cutter so the line can be cut along the edges corresponding to the strip and base makes the cutting reliable, and the cutter easily formed. The cutter can be operated with only one hand because the line can be passed through the slot 22, and then pulled toward the handle of the rod to wedge the line between the edges of the partially punched out strip and the base and cut in this manner. The abrasive surface 24 provides fast easy sharpening for any style of fish hook.

The strip or tape 32 may be a plastic strip that can be applied to the rod itself with adhesive, and is imprinted with weight figures before it is installed with the combination attachment. The calibration procedure is to place the end of the scale adjacent the ear 26 and hang a suitable calibration weight, for example a one pound or one-half pound weight at the indicated position on the tape 32, a proper distance from the hook hole 27. Then keeping this distance constant, both the weight and the cutter attachment are moved along the rod until the device balances. The fish line cutter attachment is only temporarily attached in location so the cutter can be moved along the rod until this proper position is established. Then all of the preset calibration marks on the scale will read correctly after the initial adjustment. The indicia are placed to provide use across a wide range of sizes of reels, which is the primary counterbalance weight. The rubber bands can be tightened to securely hold the attachment in proper position.

The attachment device can be attached to either the top, bottom or lateral sides of the rod, as desired by the user. Also, if desired the ears 13 and 14 can be omitted and the attachment fastened onto the rod by wrapping the ends with fish line or cord and coating the wrapping with lacquer in the manner that line guides or eyes are now fastened to rods.

The term dead-ending the hook refers to temporary storage of the hook 30 in opening 27 of ear 26 as shown in FIG. 1. The hook is held and the line can be tightened to insure the hook doesn't fall out of the opening accidentally.

What is claimed is:

1. An attachment for a fishing rod comprising an elongated body member, an integral portion of said body member being separated from the body member along at least one slit line and joining said body member at a junction region, said portion being offset from said body to expose the edges formed by the slit, said edges merging together at the junction region to provide a pair of cutting edges for a fishing line, and means to permit fastening said body member to a fishing rod.

2. The combination as specified in claim 1 and an integral ear member projecting from said body member, an opening in said ear member to provide dead-ending for a fish hook when said body member is attached to a fishing rod.

3. The combination as specified in claim 2, a fishing rod mounting said body member, said rod having a handle and an outer end and means carrying balance beam indicia mounted on said fishing rod adjacent said body member when said body member is installed on a fishing rod with the ear member positioned between the indicia and the handle and the indicia extending toward the outer end, said balance beam indicia indicating a balance weight when the fishing rod and body member are supported by said opening in said ear member.

4. The combination of claim 3 and length measuring indicia on said means carrying said balance beam indicia.

5. The combination as specified in claim 1 wherein said portion is a strip offset from said body member, and has two side edge surfaces formed when the portion is offset, and wherein both ends of said portion are attached to said body member.

6. The combination of claim 5 wherein the outwardly facing surface of said portion forms a shallow concave surface.

* * * * *